United States Patent
Matsuda et al.

(10) Patent No.: US 10,720,847 B2
(45) Date of Patent: Jul. 21, 2020

(54) SEMICONDUCTOR DEVICE FOR SWITCHING POWER SUPPLY AND AC-DC CONVERTOR

(71) Applicants: Hiroki Matsuda, Zama (JP); Satoshi Arima, Isehara (JP); Yukio Murata, Tokyo (JP)

(72) Inventors: Hiroki Matsuda, Zama (JP); Satoshi Arima, Isehara (JP); Yukio Murata, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/591,573

(22) Filed: Oct. 2, 2019

(65) Prior Publication Data
US 2020/0112256 A1    Apr. 9, 2020

(30) Foreign Application Priority Data

Oct. 4, 2018    (JP) .................................. 2018-188861

(51) Int. Cl.
| | | |
|---|---|---|
| *H02M 3/335* | (2006.01) | |
| *H02M 1/00* | (2006.01) | |
| *H02M 7/217* | (2006.01) | |
| *H02M 1/08* | (2006.01) | |

(52) U.S. Cl.
CPC ......... *H02M 3/33515* (2013.01); *H02M 1/08* (2013.01); *H02M 3/33523* (2013.01); *H02M 7/217* (2013.01)

(58) Field of Classification Search
CPC ......... H02M 3/33523; H02M 3/33515; H02M 3/33507; H02M 2001/0058
See application file for complete search history.

(56) References Cited

U.S. PATENT DOCUMENTS

| | | | |
|---|---|---|---|
| 7,492,615 B2* | 2/2009 | Morota | ................. H02M 3/335 363/21.15 |
| 8,305,775 B2 | 11/2012 | Shimada | |
| 9,601,983 B2 | 3/2017 | Chang et al. | |
| 9,627,977 B2 | 4/2017 | Sonobe | |

(Continued)

FOREIGN PATENT DOCUMENTS

| | | |
|---|---|---|
| JP | 2011078240 A | 4/2011 |
| JP | 2014124038 A | 7/2014 |

*Primary Examiner* — Adolf D Berhane
*Assistant Examiner* — Sisay G Tiku
(74) *Attorney, Agent, or Firm* — Holtz, Holtz & Volek PC

(57) ABSTRACT

A semiconductor device for a switching power supply includes first and second external terminals, ON and OFF timing generation circuits, and a drive pulse generation circuit. To the first and second external terminals, a feedback voltage and a voltage induced in an auxiliary winding are input, respectively. The ON and OFF timing generation circuits respectively generate timing signals turning on and off a switching element based on the voltages. The drive pulse generation circuit generates a pulse signal based on these signals. The ON timing generation circuit includes: a bottom detection circuit detecting a lowest point of the voltage of the second external terminal; and a timer circuit, and operates in a PWM mode and a quasi-resonant mode in response to a timing of an output of the timer circuit being before a timing of an output of the bottom detection circuit and the reverse case, respectively.

6 Claims, 15 Drawing Sheets

(56) References Cited

U.S. PATENT DOCUMENTS

| | | | | |
|---|---|---|---|---|
| 2002/0145888 | A1* | 10/2002 | Yoshinaga | H02M 3/3385 363/21.15 |
| 2009/0296437 | A1* | 12/2009 | Li | H02M 3/33507 363/89 |
| 2011/0096574 | A1* | 4/2011 | Huang | H02M 3/33507 363/21.18 |
| 2014/0177286 | A1* | 6/2014 | Sonobe | H02M 3/33507 363/21.01 |
| 2016/0261199 | A1* | 9/2016 | Adragna | H02M 3/33523 |
| 2016/0329814 | A1* | 11/2016 | Fahlenkamp | H02M 3/33523 |
| 2018/0191255 | A1* | 7/2018 | Mizoe | H02M 1/08 |
| 2018/0262096 | A1* | 9/2018 | Hsu | H02M 3/33523 |

* cited by examiner

US 10,720,847 B2

SEMICONDUCTOR DEVICE FOR SWITCHING POWER SUPPLY AND AC-DC CONVERTOR

BACKGROUND

Technological Field

The present invention relates to a semiconductor device for a switching power supply that controls a switching element on a primary side of a direct current (DC) power supply device having a transformer for voltage conversion, in particular, to a technology that is effective by being used in a semiconductor device for a switching power supply that can operate by pulse width modulation (PWM) control and quasi-resonant control or an AC-DC convertor that uses the semiconductor device.

Description of the Related Art

As the DC power supply device, there is an insulated AC-DC convertor configured by including: a diode bridge circuit that rectifies an alternating current (AC) voltage; and a DC-DC convertor that steps down and converts, into a DC voltage of a desired potential, a DC voltage obtained by the diode bridge circuit rectifying the AC voltage. As the insulated AC-DC convertor, there is known, for example, a switching power supply device that turns on and off a switching element connected in series to a primary-side winding of a transformer for voltage conversion by using the PWM control system, the quasi-resonant control system, or the like to control a current that flows in the primary-side winding and consequently control a voltage induced in a secondary-side winding.

As a conventional switching power supply device employing the PWM control system, there is a switching power supply device that switches between the PWM control system and a PFM (pulse frequency modulation) control system to execute. Meanwhile, a technology related to a conventional switching power supply device employing the quasi-resonant control system is disclosed, for example, in JP 2014-124038 A and U.S. Pat. No. 9,601,983 B1. As disclosed in JP 2014-124038 A and U.S. Pat. No. 9,601,983 B1, the conventional switching power supply device employing the quasi-resonant control system operates in the quasi-resonant control mode only.

The PWM control and the quasi-resonant control each have advantages and disadvantages. The PWM control has disadvantages, for example, in generating a large switching loss and swinging noise and having a somewhat low power efficiency, but has advantages, for example, in causing no phenomenon called acoustic noise, and being executable in a continuous current mode too and hence requiring no large transformer. On the other hand, the quasi-resonant control has disadvantages, for example, in causing acoustic noise owing to bottom skip, and being executable in a discontinuous current mode only and hence requiring large components including a large transformer and a large output capacitor, but has advantages, for example, in enabling soft switching (soft turn-on) of turning on a switching element at the bottom of a zero current resonant voltage and hence generating a small switching loss and switching noise and having a high power efficiency.

There is disclosed, for example, in JP 2011-78240 A a switching power supply device that performs PWM control during a soft start period at the time of start-up of a power supply, and switches PWM control to quasi-resonant control by using a frequency control system after the soft start period finishes, thereby eliminating an audible field oscillation frequency.

However, there has not been realized yet a switching power supply device that operates with a control IC (semiconductor device) provided on the primary side and switching between PWM control and quasi-resonant control during normal operation after a power supply is started, and consequently has advantages of both control systems.

SUMMARY

The present invention has been conceived in view of the above problems, and objects of the present invention include providing a semiconductor device for a switching power supply and an AC-DC convertor that switch between PWM control and quasi-resonant control during normal operation after a power supply is started, and consequently have a high power efficiency on average and contribute to miniaturization of power supply devices by reducing sizes of components, such as a transformer.

To achieve at least one of the abovementioned objects, according to an aspect of the present invention, there is provided a semiconductor device for a switching power supply, the semiconductor device generating a drive signal for ON/OFF control of a switching element connected in series to one terminal of a primary-side winding of a transformer for voltage conversion including an auxiliary winding, including:

a first external terminal to which a feedback voltage corresponding to a voltage output from a secondary side of the transformer is input;

a second external terminal to which a voltage induced in the auxiliary winding or a voltage obtained by dividing the induced voltage is input;

an ON timing generation circuit that generates a timing signal that turns on the switching element, based on the voltage of the first external terminal and the voltage of the second external terminal;

an OFF timing generation circuit that generates timing signal that turns off the switching element, based on the voltage of the first external terminal and a voltage proportional to a current that flows in the switching element; and a drive pulse generation circuit that generates a pulse signal as an origin of the drive signal, based on the signal output from the ON timing generation circuit and the signal output from the OFF timing generation circuit, wherein the ON timing generation circuit includes:
  a bottom detection circuit that detects a lowest point of the voltage of the second external terminal; and
  a first timer circuit that measures a predetermined time, and the ON timing generation circuit,
  in response to a change timing of an output of the first timer circuit being before a change timing of an output of the bottom detection circuit, controls the drive pulse generation circuit such that after the measurement by the first timer circuit, the pulse signal rises at an output timing of the first timer circuit, thereby operating in a pulse width modulation mode, and
  in response to the change timing of the output of the bottom detection circuit being before the change timing of the output of the first timer circuit, controls the drive pulse generation circuit such that the pulse signal rises at an output timing of the bottom detection circuit, thereby operating in a quasi-resonant mode.

BRIEF DESCRIPTION OF THE DRAWINGS

The advantages and features provided by one or more embodiments of the present invention will become more fully understood from the detailed description given hereinbelow and the appended drawings which are given by way of illustration only, and thus are not intended as a definition of the limits of the present invention, wherein.

DETAILED DESCRIPTION OF EMBODIMENTS

Hereinafter, one or more preferred embodiments of the present invention will be described with reference to the drawings.

Figure 1:
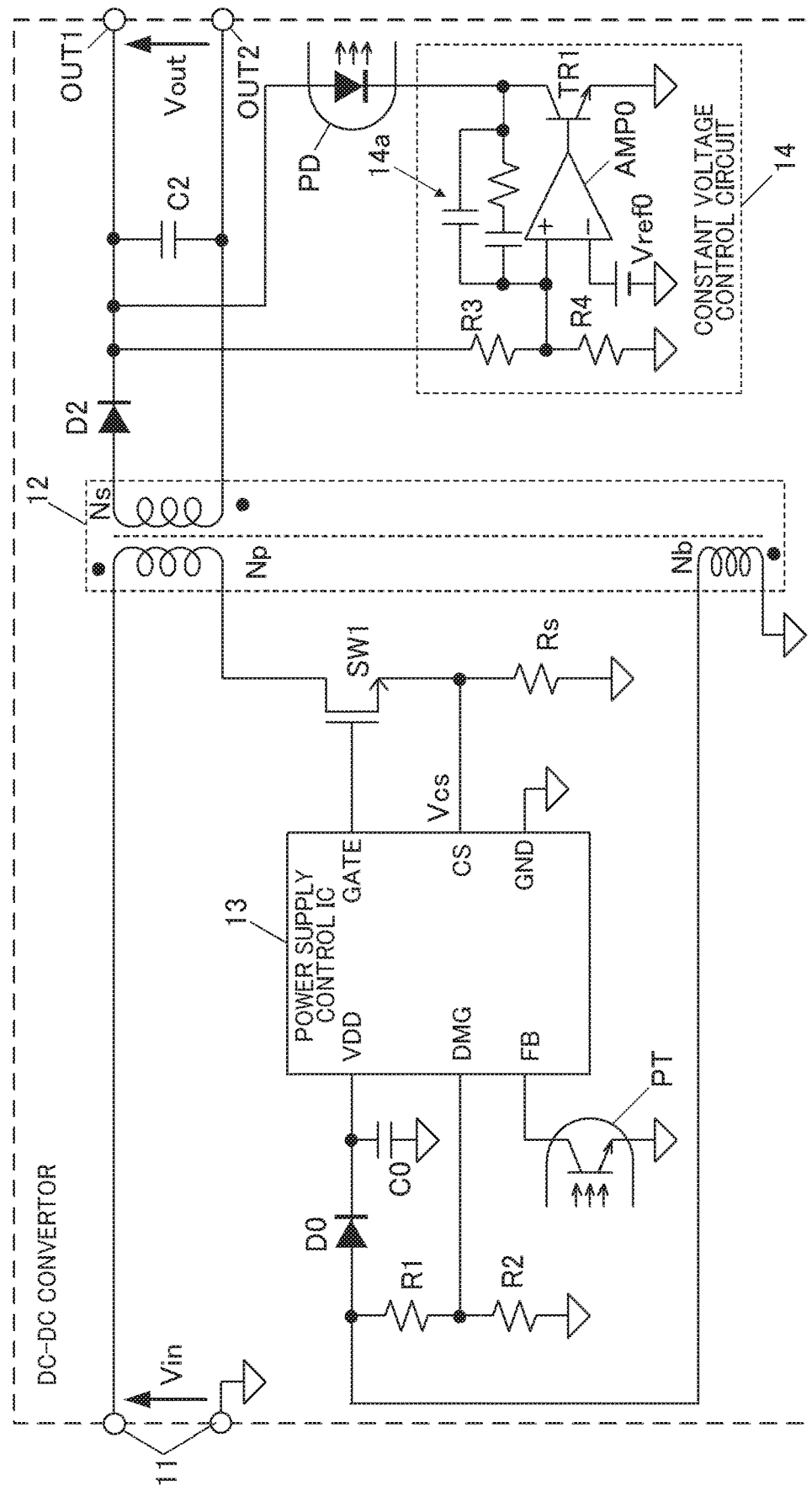
FIG. 1 is a circuit diagram showing an embodiment of a DC-DC convertor as a DC power supply device having effects with a semiconductor device for a switching power supply of the present invention applied.

FIG. 1 is a circuit diagram showing an embodiment of a DC-DC convertor as a DC power supply device to which a semiconductor device for a switching power supply of the present invention is applied.

The DC-DC convertor of this embodiment includes: a pair of voltage input terminals 11 to which a direct current is input; a transformer 12 for voltage conversion having a primary-side winding Np, a secondary-side winding Ns, and an auxiliary winding Nb; a switching transistor SW1 (switching element) connected in series to the primary-side winding Np of the transformer 12; and the semiconductor device for a switching power supply (hereinafter "power supply control IC") 13 that turns/drives on and off the switching transistor SW1. In order to configure an AC-DC convertor, a diode bridge circuit that rectifies an AC voltage received from an AC power supply and a smoothing capacitor are connected to a stage preceding the input terminals 11.

In this embodiment, the switching transistor SW1 is constituted of an N-channel MOSFET (insulated gate field effect transistor) as a discrete component. The power supply control IC 13 has an output terminal GATE from which a gate drive signal(s) that drives the gate of the switching transistor SW1 is output.

In the DC-DC convertor of this embodiment, there is provided, on the primary side of the transformer 12, a rectifying/smoothing circuit including a diode DO for rectification connected in series to the auxiliary winding Nb and a capacitor CO for smoothing connected between the cathode terminal of the diode DO and a ground point GND. A voltage rectified and smoothed by this rectifying/smoothing circuit is applied to a power supply voltage terminal VDD. The power supply control IC 13 also has an external terminal DMG to which a voltage (VDMG) obtained by resistors R1, R2 dividing a voltage induced in the auxiliary winding Nb is applied.

The power supply control IC 13 also has an external terminal FB to which a phototransistor PT constituting a part of a photocoupler, which is for transmitting an output voltage detection signal(s) of the secondary side to the primary side as a feedback voltage VFB, is connected.

The power supply control IC 13 also has an external terminal CS as a current detection terminal to which a voltage Vcs obtained by a current sense resistor Rs (resistor for current detection) performing current-to-voltage conversion is input. The current sense resistor Rs is provided between the source terminal of the switching transistor SW1 and the ground point GND.

On the secondary side of the transformer 12, there are provided: a diode D2 for rectification connected in series to one terminal of the secondary-side winding Ns; and a capacitor C2 for smoothing connected between the cathode terminal of the diode D2 and the other terminal of the secondary-side winding Ns. The diode D2 and the capacitor C2 generate and output a DC voltage Vout by rectifying and smoothing an AC voltage that is induced in the secondary-side winding Ns by intermittently flowing a current to the primary-side winding Np.

On the secondary side of the transformer 12, there are also provided: a constant voltage control circuit (shunt regulator)

14 constituting an output voltage detection circuit that detects the output voltage Vout; and a photo-diode PD constituting a part of the photocoupler, which is for transmitting an output voltage detection signal(s) corresponding to the voltage detected by the constant voltage control circuit 14 to the primary side. The constant voltage control circuit 14 flows a current corresponding to the detected voltage to the photo-diode PD, and the current is transmitted to the primary side as an optical signal having a degree of intensity corresponding to the detected voltage, so that a current corresponding to the light intensity flows in the phototransistor PT and is converted by a pullup resistor (Rp in FIG. 2) or the like provided in the power supply control IC 13 into the feedback voltage VFB and input there.

The constant voltage control circuit 14 includes: a bipolar transistor TR1 connected in series to the photodiode PD; resistors R3, R4 that divide the output voltage Vout of the secondary side; an error amplifier AMP0 that (i) compares a voltage obtained by the resistors R3, R4 dividing the output voltage Vout with a reference voltage Vref0, and (ii) outputs a voltage corresponding to their potential difference; and a phase compensating circuit 14a. The output voltage of the error amplifier AMP0 is applied to the base terminal of the transistor TR1, so that a current corresponding to the output voltage Vout flows there. In this embodiment, the higher the output voltage Vout of the secondary side is, the more the currents flowing in the photo-diode PD and the phototransistor PT are, and the lower the voltage VFB of the external terminal FB of the power supply control IC 13 is.

Next, a specific example of circuit configuration of the power supply control IC 13 of this embodiment and its functions will be described with reference to FIG. 2.

Figure 2:
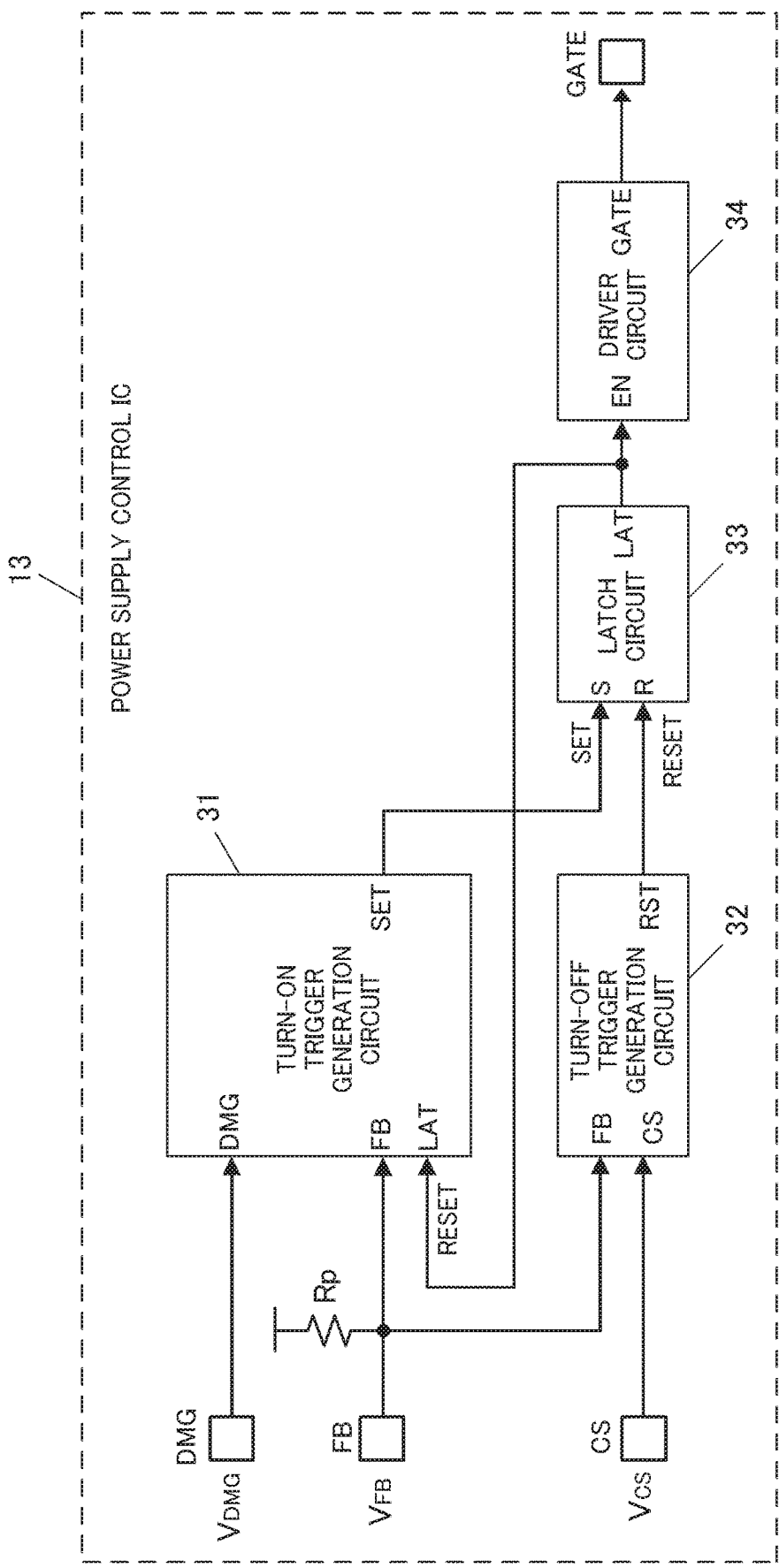
FIG. 2 is a circuit diagram showing an example of the semiconductor device of the present invention that is provided on the primary side of a transformer in the DC-DC convertor shown in FIG. 1.

As shown in FIG. 2, the power supply control IC 13 of this embodiment includes: a turn-on trigger generation circuit 31 that receives the voltage VDMG of the external terminal DMG and the voltage VFB of the external terminal FB as input voltages and generates a timing signal(s) that turns on the switching transistor SW1; a turn-off trigger generation circuit 32 that receives the voltage VFB of the external terminal FB and the voltage Vcs of the external terminal CS as input voltages and generates a timing signal(s) that turns off the switching transistor SW1; a latch circuit 33 that is constituted of an RS flip-flop or the like, and receives an output of the turn-on trigger generation circuit 31 and an output of the turn-off trigger generation circuit 32 as inputs; and a driver circuit 34 that generates a gate drive signal(s) that drives the switching transistor SW1, in accordance with an output LAT of the latch circuit 33, and outputs the gate drive signal from the external terminal GATE.

The output LAT of the latch circuit 33 is also input to the turn-on trigger generation circuit 31 as a signal LAT that resets the turn-on trigger generation circuit 31.

Hereinafter, a specific example and operation of each functional block of the power supply control IC 13 will be described.

Figure 3:
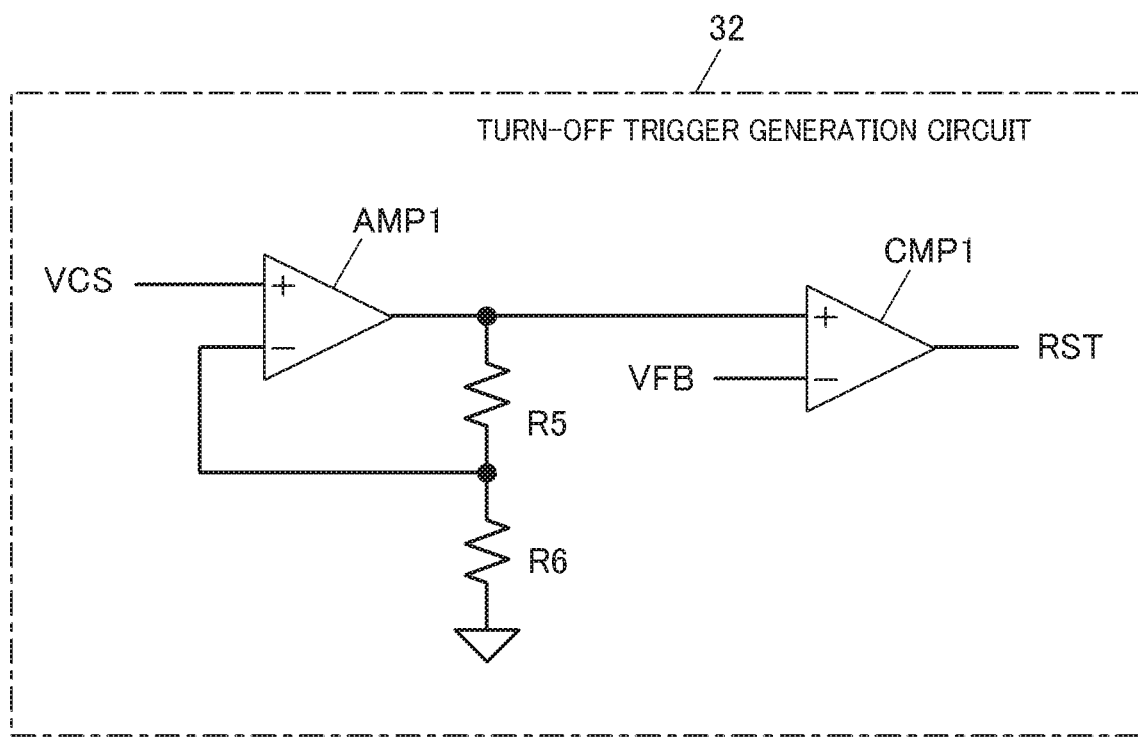
FIG. 3 is a circuit diagram showing a specific example of a turn-off trigger generation circuit included in the semiconductor device.

FIG. 3 shows a specific example of circuit configuration of the turn-off trigger generation circuit 32. As shown in FIG. 3, the turn-off trigger generation circuit includes: an amplifier circuit that (i) includes an operational amplifier AMP1 and voltage dividing resistors R5, R6 that divide an output voltage of the operational amplifier AMP1, and (ii) amplifies the voltage Vcs of the external terminal CS; and a comparator CMP1 that compares an output voltage of the amplifier circuit with the voltage VFB of the external terminal FB. Between the output terminal of the operational amplifier AMP1 and a ground point, the voltage dividing resistors R5, R6 are provided. The operational amplifier AMP1 outputs the voltage amplified such that a potential at a connection node of the voltage dividing resistors R5, R6 input to the inverting input terminal is matched with the voltage Vcs of the non-inverting input terminal by a virtual ground operation.

Figure 4:
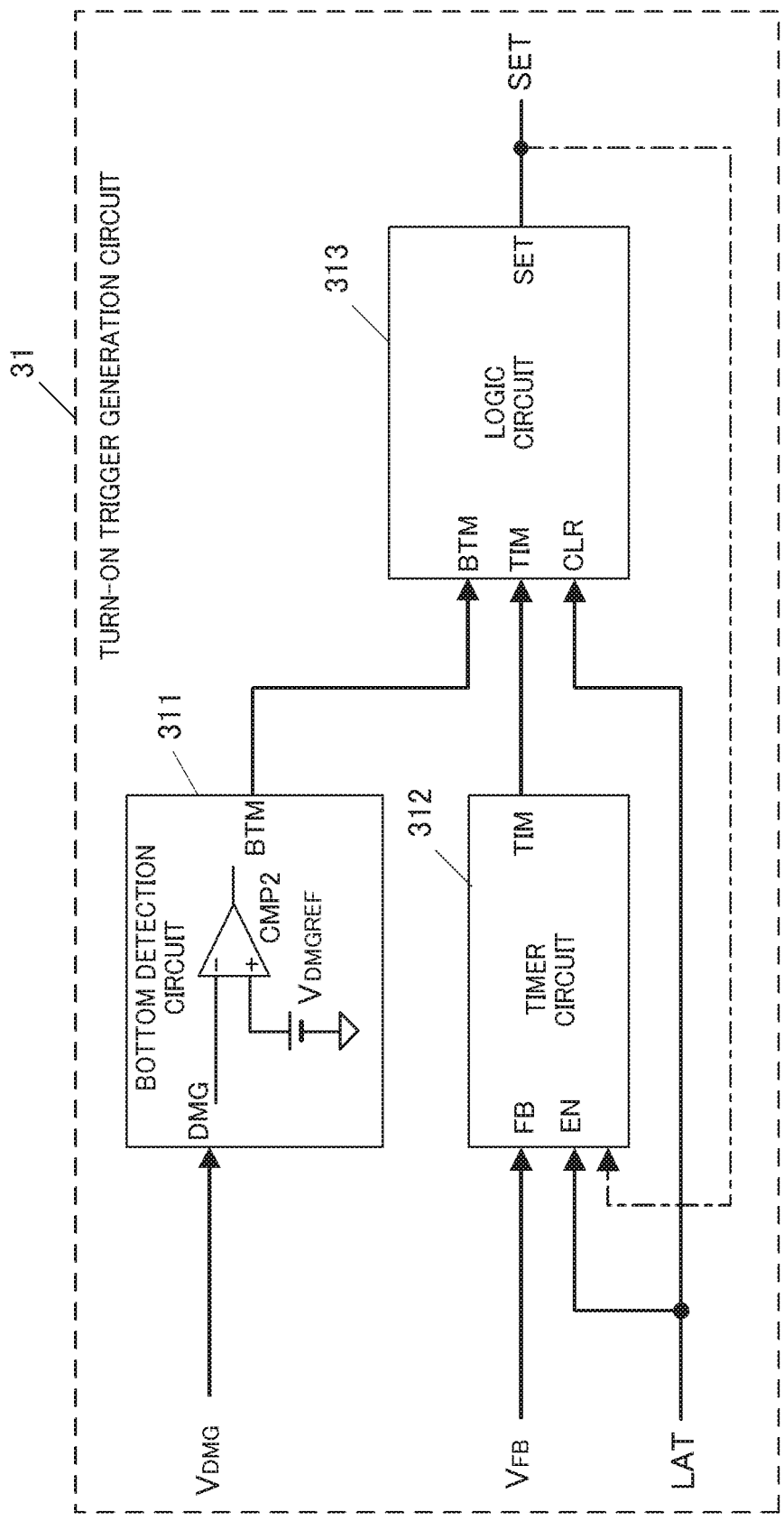
FIG. 4 is a circuit diagram showing a specific example of a turn-on trigger generation circuit included in the semiconductor device.

FIG. 4 shows a specific example of circuit configuration of the turn-on trigger generation circuit 31. As shown in FIG. 4, the turn-on trigger generation circuit 31 includes: a bottom detection circuit 311 that (i) includes a comparator CMP2 that compares the voltage (voltage proportional to the voltage induced in the auxiliary winding Nb) VDMG of the external terminal DMG with a reference voltage VDMGREF (≈0 V), and (ii) detects the lowest voltage point of the external terminal DMG; a timer circuit 312 that receives the voltage VFB of the external terminal FB as an input, and measures a predetermined time; and a logic circuit 313 that receives an output BTM of the bottom detection circuit 311, an output TIM of the timer circuit 312, and the output LAT of the latch circuit 33 as inputs.

The bottom detection circuit 311 operates as a comparator that inverts its output in accordance with the phase of characteristics of zero current resonance of the auxiliary winding Nb. The timer circuit 312 operates with the output LAT of the latch circuit 33 as a trigger signal. The logic circuit 313 operates with the output LAT of the latch circuit 33 as a clear signal for the circuit 313. That is, the timer circuit 312 starts measuring a time corresponding to the voltage VFB of the external terminal FB when the output LAT of the latch circuit 33 changes to a high level, and an output SET of the logic circuit 313 changes to a low level when the output LAT of the latch circuit 33 changes to the high level.

Hence, the higher the voltage VFB of the external terminal FB is (the larger the output current of the secondary side is), the shorter time the timer circuit 312 measures. As it is obvious in the following description, in this embodiment, this measurement time is used as a switching cycle in a PWM mode (continuous current mode) and a zero current detection period in a quasi-resonant mode (discontinuous current mode). The timer circuit 312 may operate with not the output LAT of the latch circuit 33 but the output SET of the logic circuit 313 as a trigger signal as indicated by a dash-dot-dash line.

Figure 5:
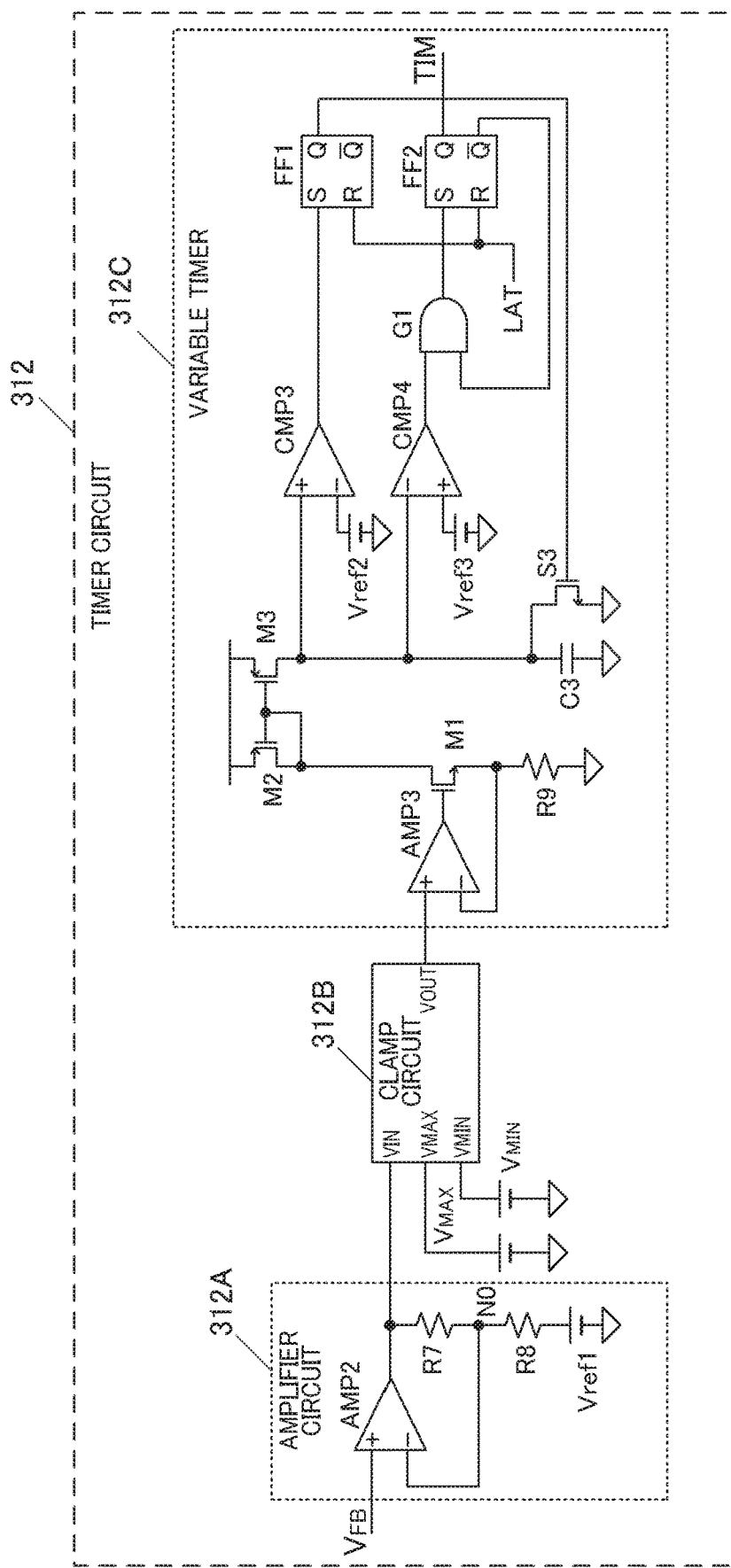
FIG. 5 is a circuit diagram showing a specific example of a timer circuit included in the turn-on trigger generation circuit shown in FIG. 4.

FIG. 5 shows a specific example of circuit configuration of the timer circuit 312. As shown in FIG. 5, the timer circuit 312 includes: an amplifier circuit 312A including an operational amplifier (arithmetic/amplifier circuit) AMP2 that amplifies the voltage VFB of the external terminal FB, voltage dividing resistors R7, R8 that divide an output of the operational amplifier AMP2, and a reference voltage Vref1 that is provided between the voltage dividing resistor R8 and a ground point and increases a potential at a connection node N0 of the voltage dividing resistors R7, R8 by a predetermined amount; a clamp circuit 312B that clamps an output voltage of the amplifier circuit 312A while calculating and amplifying the output voltage; and a variable timer 312C. The clamp circuit 312B is constituted of an arithmetic circuit having a voltage clamp function.

The variable timer 312C includes: a voltage-to-current conversion unit that has an operational amplifier AMP3, a MOS transistor M1, and a resistor R9, and converts an output voltage of the clamp circuit 312B into a current; a current mirror circuit that includes MOS transistors M2, M3, and generates a current proportional to the current into which the output voltage of the clamp circuit 312B is converted; a capacitor C3 that is charged with the current of the MOS transistor M3; and a discharge switch S3 for discharging the capacitor C3 that has been charged.

The variable timer 312C also includes: two comparators CMP3, CMP4 that receive a charge potential of the capacitor C3 as an input; RS flip-flops FF1, FF2 that latch outputs of the comparators CMP3, CMP4; and an AND gate G1 that receives the output of the comparator CMP4 and an inverted output Q of the RS flip-flop FF2 as inputs.

The discharge switch S3 is turned on or off by an output of the flip-flop FF1. The RS flip-flop FF1 is set by the output of the comparator CMP3, and the RS flip-flop FF2 is set by an output of the AND gate G1. The RS flip-flops FF1, FF2 are reset by the output LAT of the latch circuit 33.

A comparison voltage Vref2 applied to the inverting input terminal of the comparator CMP3 and a comparison voltage Vref3 applied to the non-inverting input terminal of the comparator CMP3 are set so as to have a relationship of "Vref2>Vref3". When the charge potential of the capacitor C3 reaches the comparison voltage Vref3, under the condition that the RS flip-flop FF2 is reset, the RS flip-flop FF2 is set by the output of the comparator CMP4, and its output changes from the low level to the high level. This output of the flip-flop FF2 is supplied to the logic circuit 313 as a timeout signal TIM. When the charge potential of the capacitor C3 reaches the comparison voltage Vref2, the RS flip-flop FF1 is set by the output of the comparator CMP3, and its output changes from the low level to the high level, thereby turning on the discharge switch S3, thereby discharging the capacitor C3 that has been charged.

Figure 16:
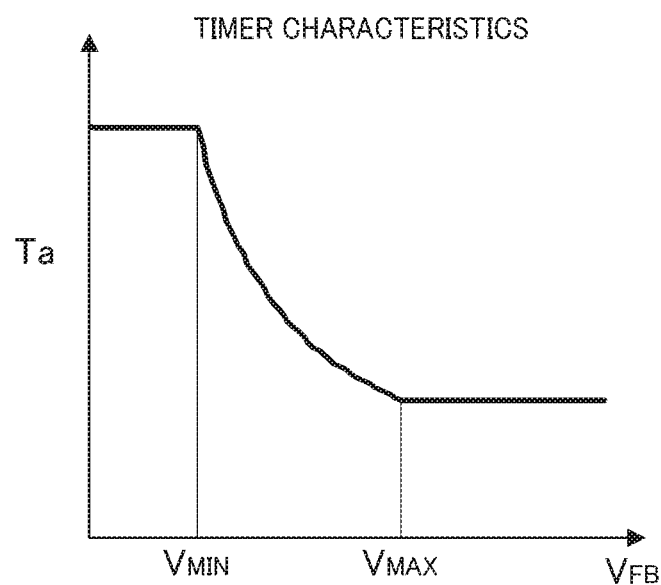
FIG. 16 is a graph showing a relationship between a feedback voltage VFB of an external terminal FB included in the timer circuit shown in FIG. 5 and a measurement time Ta measured by the timer circuit.

FIG. 16 shows a relationship between a time Ta measured by the timer circuit 312 (measurement time Ta) and the voltage VFB of the external terminal FB. As shown in FIG. 16, the time Ta measured by the timer circuit 312 is designed so as to be inversely proportional to the voltage VFB of the external terminal FB (designed such that VFB is a linear function of the reciprocal of Ta, i.e. 1/Ta, or a fixed value). The maximum value and the minimum value of the measurement time Ta are respectively limited by a clamp voltage VMIN applied to the clamp circuit 312B and a clamp voltage VMAX applied to the clamp circuit 312B, wherein VMAX>VMIN, The Ta-VFB curve is provided by the arithmetic function of the clamp circuit 312B.

Figure 6:
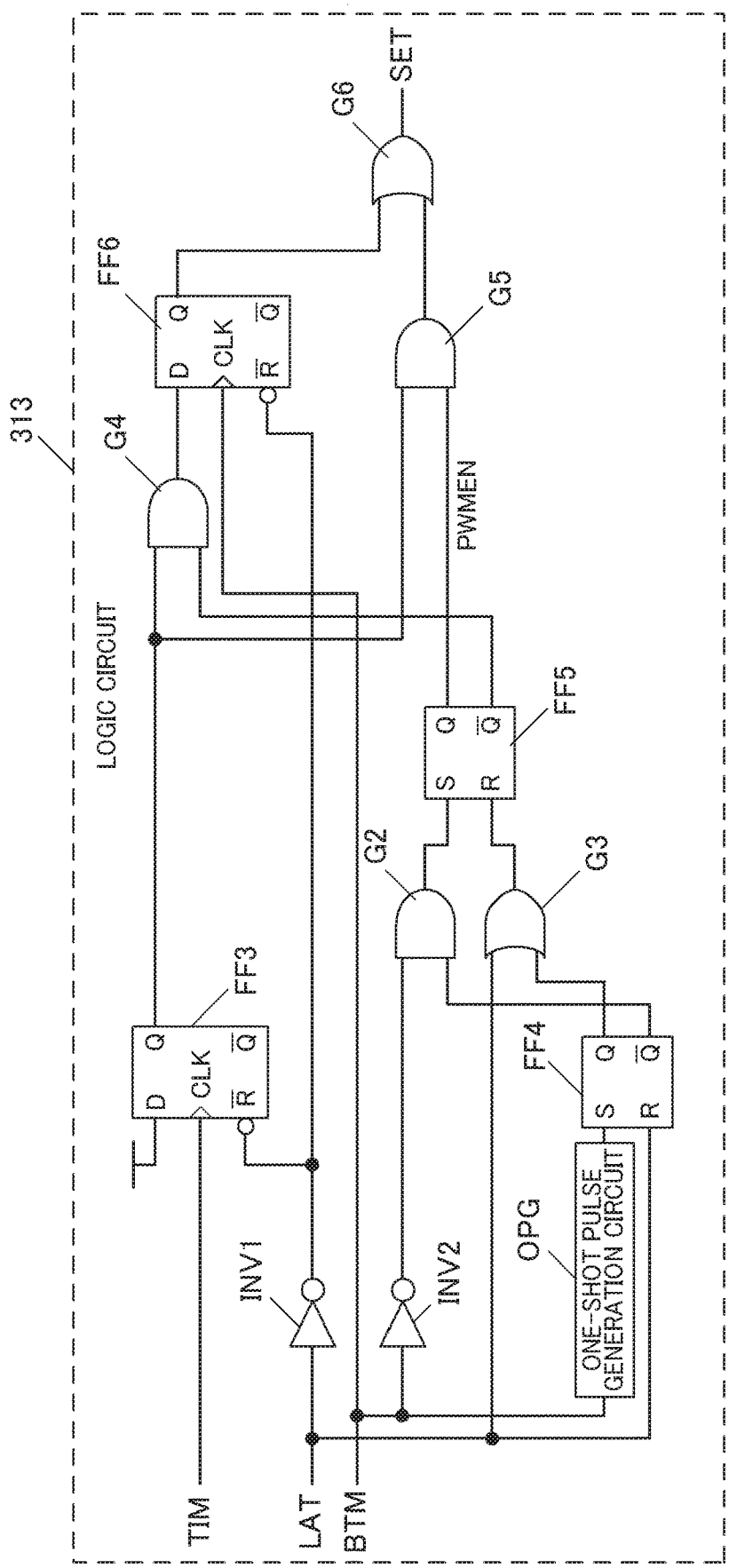
FIG. 6 is a circuit diagram showing a specific example of a logic circuit included in the turn-on trigger generation circuit shown in FIG. 4.

FIG. 6 shows a specific example of circuit configuration of the logic circuit 313. As shown in FIG. 6, the logic circuit 313 includes: a D flip-flop FF3 having a clock terminal to which the output signal TIM of the timer circuit 312 is input; an inverter INV1 that inverts the output LAT of the latch circuit 33; an inverter INV2 that inverts the output BTM of the bottom detection circuit 311; a one-shot pulse generation circuit OPG that detects rising (rising/leading edge) of the output BTM and generates a pulse signal(s); and an RS flip-flop FF4 that receives an output of the one-shot pulse generation circuit OPG as a set signal and the output LAT of the latch circuit 33 as a reset signal.

The logic circuit 313 also includes: an AND gate G2 that receives an output of the inverter INV2 and an inverted output $\overline{Q}$ of the RS flip-flop FF4 as inputs; an OR gate G3 that receives the output LAT of the latch circuit 33 and an output Q of the RS flip-flop FF4 as inputs; an RS flip-flop FF5 that receives an output of the AND gate G2 as a set signal and an output of the OR gate G3 as a reset signal; an AND gate G4 that receives an output Q (PWMEN) of the D flip-flop FF3 and an inverted output $\overline{Q}$ of the RS flip-flop FF5 as inputs; and a D flip-flop FF6 that (i) has a clock terminal to which the output BTM of the bottom detection circuit 311 is input, and (ii) captures an output of the AND gate G4.

The logic circuit 313 also includes: an AND gate G5 that receives the output Q of the D flip-flop FF3 and an output Q of the RS flip-flop FF5 as inputs; and an OR gate G6 that receives an output of the AND gate G5 and an output Q Of the D flip-flop FF6 as inputs. An output of the OR gate G6 is supplied to the latch circuit 33 as a trigger signal SET that turns on the switching transistor SW1, thereby setting the latch circuit 33. The D flip-flop FF6 is reset by an output of the inverter INV1 that inverts the output LAT of the latch circuit 33.

The output signal TIM of the timer circuit 312 input to the logic circuit 313 is, as described above, a timing signal that changes when the time Ta corresponding to the voltage VFB of the external terminal FB has been measured. If the output BTM of the bottom detection circuit 311 rises first, the output signal TIM of the timer circuit 312 rises following the output BTM, and then the turn-on trigger signal SET changes when the output BTM of the bottom detection circuit 311 rises again. On the other hand, if the time Ta elapses before the output BTM of the bottom detection circuit 311 is input, the turn-on trigger signal SET changes when the timer circuit 312 has measured the time Ta and the output signal TIM changes.

Next, operation of the power supply control IC 13 having the above configuration will be described with reference to timing charts shown in FIG. 7 and FIG. 8. FIG. shows change in signal of each component of the power supply control IC 13 in the case where the output signal TIM of the timer circuit 312 rises before the output BTM of the bottom detection circuit 311. FIG. 8 shows change in signal Of each component of the power supply control IC 13 in the case where the output BTM of the bottom detection circuit 311 rises before the output signal TIM of the timer circuit 312.

Figure 7:
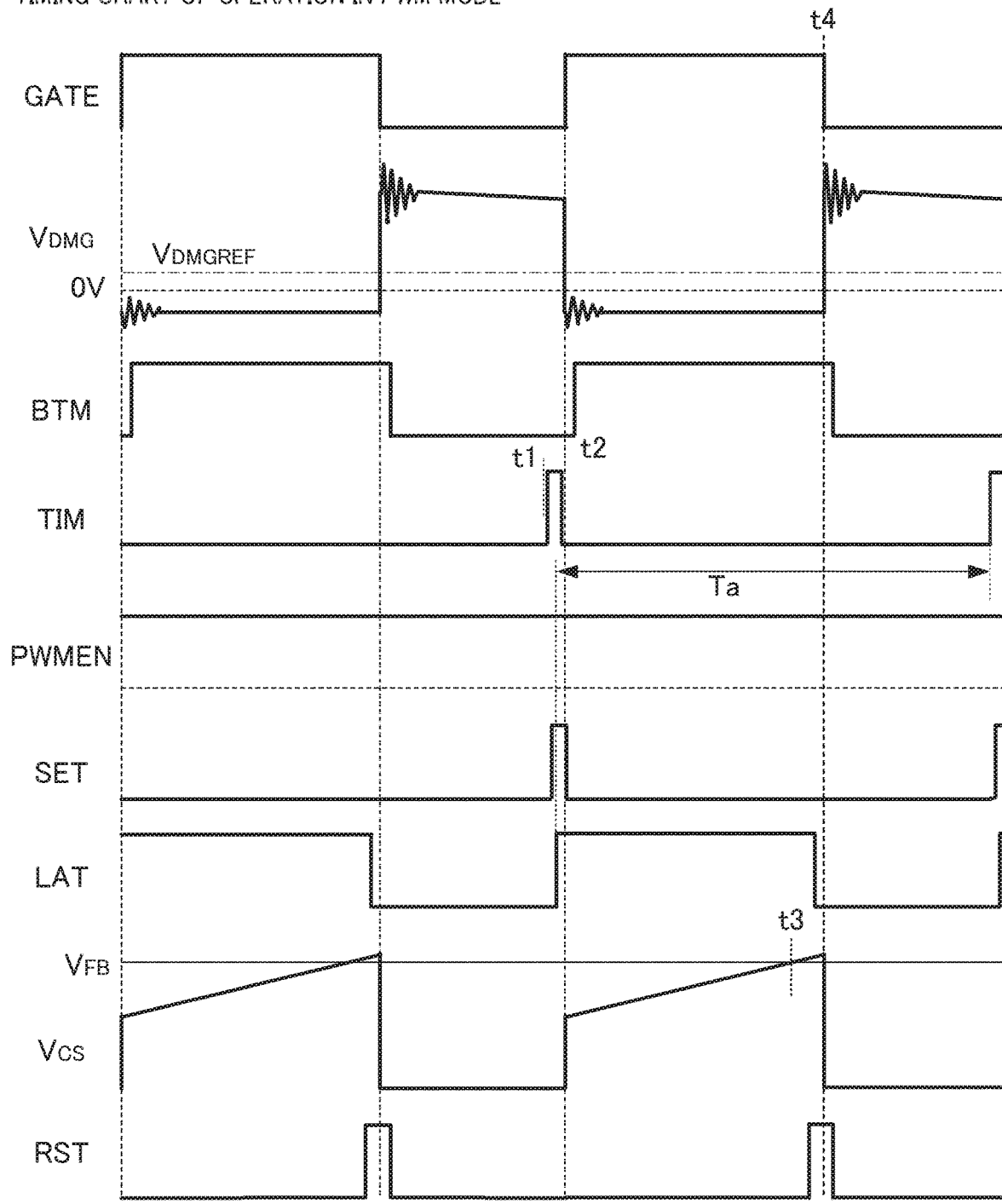
FIG. 7 is a timing chart showing change in signal of each component of the semiconductor device in a case where the semiconductor device operates in a PWM mode.
Figure 8:
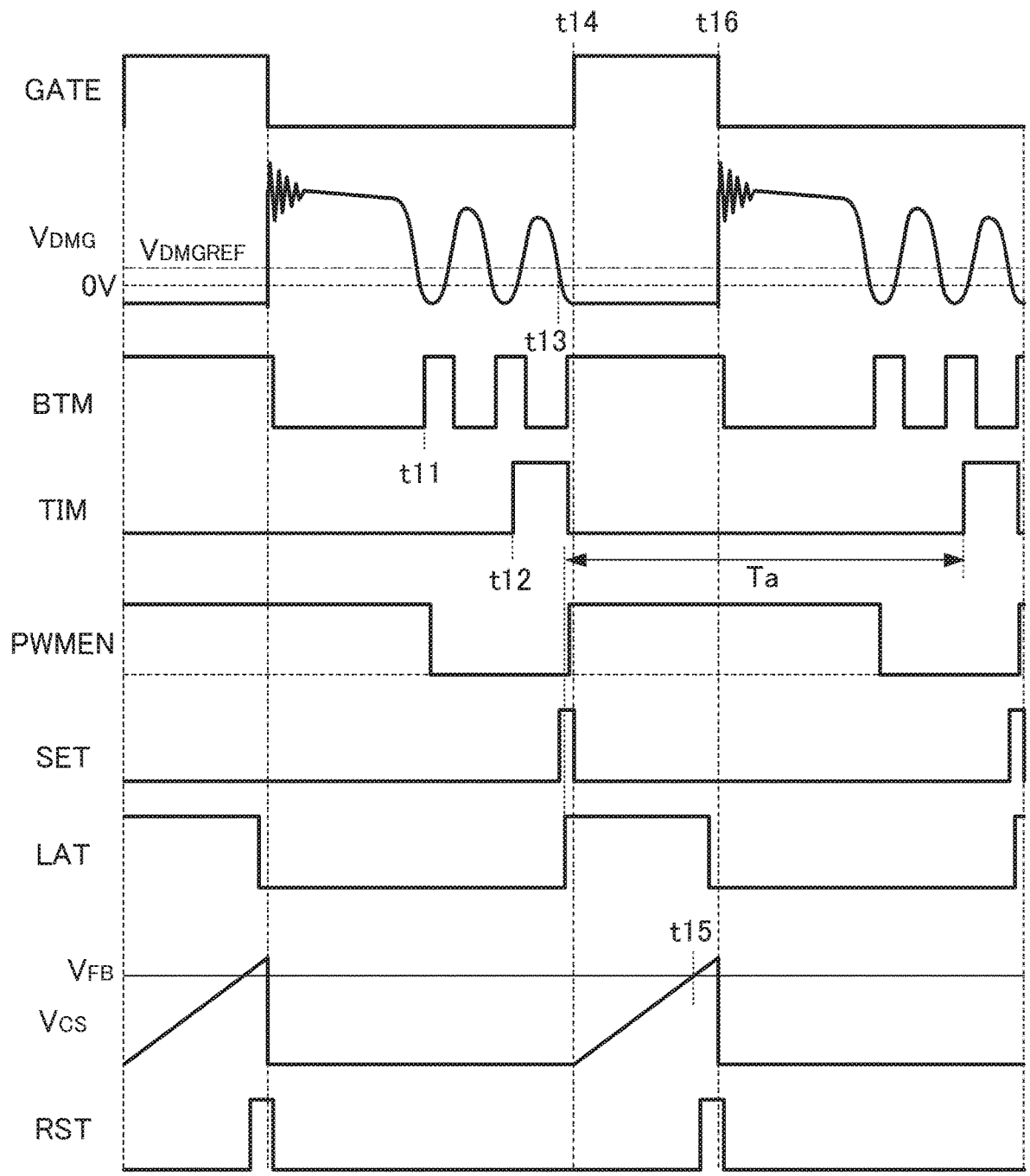
FIG. 8 is a timing chart showing change in signal of each component of the semiconductor device in a case where the semiconductor device operates in a quasi-resonant mode.

In FIG. 7, the output signal TIM of the timer circuit 312 changes from the low level to the high level (timing t1) before the output BTM of the bottom detection circuit 311 changes from the low level to the high level (timing t2). When the output signal TIM changes to the high level (timing t1), the turn-on trigger signal SET as the output of the logic circuit 313 changes to the high level, the output LAT of the latch circuit 33 changes to the high level, and the gate drive signal GATE output from the driver circuit 34 changes to the high level, thereby turning on the switching transistor SW1. When the output LAT of the latch circuit 33 changes to the high level, the D flip-flop FF6 is reset by the inverted signal (output of the inverter INV1), so that the turn-on trigger signal SET changes to the low level and becomes a pulse. At the timing when the output LAT changes to the high level, the timer circuit 312 is reset, and starts measuring the next time Ta.

When the switching transistor SW1 is turned on, a current flows into the primary-side winding Np of the transformer 12, and the potential of the current sense resistor Rs, namely the potential Vcs of the external terminal CS, gradually increases accordingly, and when the voltage Vcs reaches the voltage VFB of the external terminal FB (timing t3), an output RST of the turn-off trigger generation circuit 32 changes from the low level to the high level, and the gate drive signal GATE output from the driver circuit 34 changes to the low level (timing t4), thereby turning off the switching transistor SW1.

In the above operation, the higher the voltage VFB of the external terminal FB is, namely the larger the output current of the secondary side is, the higher the peak of the potential Vcs of the external terminal CS is, namely the higher the peak of the current in the primary-side winding Np of the transformer 12 is, and the longer the period during which the gate drive signal GATE is at the high level is, namely the longer the period during which the switching transistor SW1 is ON is. As shown in FIG. 16, the higher the voltage VFB is, the shorter the switching cycle is. Hence, if the voltage VFB of the external terminal FB exceeds a predetermined voltage, an OFF time during which the switching transistor SW1 is OFF is shorter than a time for electricity (current) to be released from the secondary-side winding Ns of the transformer 12 to an output terminal OUT1 via the diode D2 until being zero. As a result, in a region where the voltage VFB is high, the output signal TIM of the timer circuit 312 rises before or right after zero current resonance is started, namely, before the output BTM of the bottom detection circuit 311 rises. Hence, the power supply control IC 13 performs switching control in a PWM mode.

On the other hand, as shown in FIG. 8, if the output BTM of the bottom detection circuit 311 changes (timing t11) before the output signal TIM of the timer circuit 312 changes, the output Q (PWMEN) of the flip-flop FF4 in the logic circuit 313 changes to the low level at the timing, and thereafter the output signal TIM of the timer circuit 312 changes to the high level (timing t12). After the output signal TIM changes to the high level, the output BTM of the bottom detection circuit 311 changes to the high level at the timing when the potential VDMG of the external terminal DMG first reaches the bottom (timing t13). Also, the turn-on trigger signal SET as the output of the logic circuit 313 changes to the high level, the output LAT of the latch circuit 33 changes to the high level, and the gate drive signal GATE output from the driver circuit 34 changes to the high level (timing t14), thereby turning on the switching transistor SW1. That is, the switching transistor SW1 is turned on at the bottom of the potential VDMG of the external terminal DMG. At the timing when the output LAT changes to the high level, the timer circuit 312 is reset and starts measuring the next time Ta.

When the switching transistor SW1 is turned on, a current flows into the primary-side winding Np of the transformer 12, and the potential of the current sense resistor Rs, namely the potential Vcs of the external terminal CS, gradually increases accordingly, and when the voltage Vcs reaches the voltage VFB of the external terminal FB (timing t15), the output RST of the turn-off trigger generation circuit 32 changes from the low level to the high level, and the gate drive signal GATE output from the driver circuit 34 changes to the low level (timing t16), thereby turning off the switching transistor SW1.

In the above operation, in a region where the voltage VFB is low to the extent that the clamp circuit 312B does not clamp the voltage VFB, as shown in FIG. 16, the time Ta measured by the timer circuit 312 changes according to the voltage VFB in accordance with VFB being the linear function of the reciprocal of Ta, i.e. 1/Ta. The lower the voltage VFB of the external terminal FB is, namely the smaller the output current of the secondary side is, the longer the time Ta is, namely the longer the switching cycle of the switching transistor SW1 is. As a result, the zero current resonance is started and the output BTM of the bottom detection circuit 311 changes before the output signal TIM of the timer circuit 312 changes, and the switching transistor SW1 is turned on at the bottom of the potential VDMG of the external terminal DMG. Hence, the power supply control IC 13 performs switching control in the quasi-resonant mode.

As described above, the logic circuit 313 functions as a switching unit that switches between the PWM mode and the quasi-resonant mode. With the appropriately designed time Ta or the like measured by the timer circuit 312, the power supply control IC 13 of this embodiment can operate in the PWM mode in a region where the output current is 100% or around of a rated load current, and operate in the quasi-resonant mode in a region(s) where the output current is less than that. Because the PWM mode is lower than the quasi-resonant mode in power efficiency, the power supply device that uses the power supply control IC 13 of this embodiment is low in power efficiency while operating in the region where the output current is 100% or around of the rated load current. However, this power supply device operates in the quasi-resonant mode, which is high in power efficiency, in the regions where the output current is, for example, 75%, 50%, and 25% of the rated load current. Hence, this power supply device has a higher power efficiency on average than a power supply device that operates in the PWM mode in any region.

Further, a transformer needs to have a size with which the core is not saturated when a winding current is the largest. A larger winding current requires a larger transformer. Operation in the quasi-resonant mode is always operation in the discontinuous current mode. Hence, around a rated load, the switching frequency decreases, and the peak of the winding current becomes high. On the other hand, operation in the PWM mode is always operation in the continuous current mode. Hence, even around the rated load, the switching frequency does not decrease, and the peak of the winding current is lower than that in the quasi-resonant mode. Hence, the transformer 12 can be smaller than that of a power supply device that operates in the quasi-resonant mode only.

Further, the higher the frequency is, the smaller the impedance of an output capacitor is, and the more the output ripple is reduced. Around a rated load, operation in the PWM mode results in a higher frequency than operation in the quasi-resonant mode. Hence, the output capacitor C2 can have a smaller capacity and size than the power supply device that operates in the quasi-resonant mode only.

[Modifications]

Next, modifications of the power supply control IC 13 of the above embodiment will be described.

Figure 9:
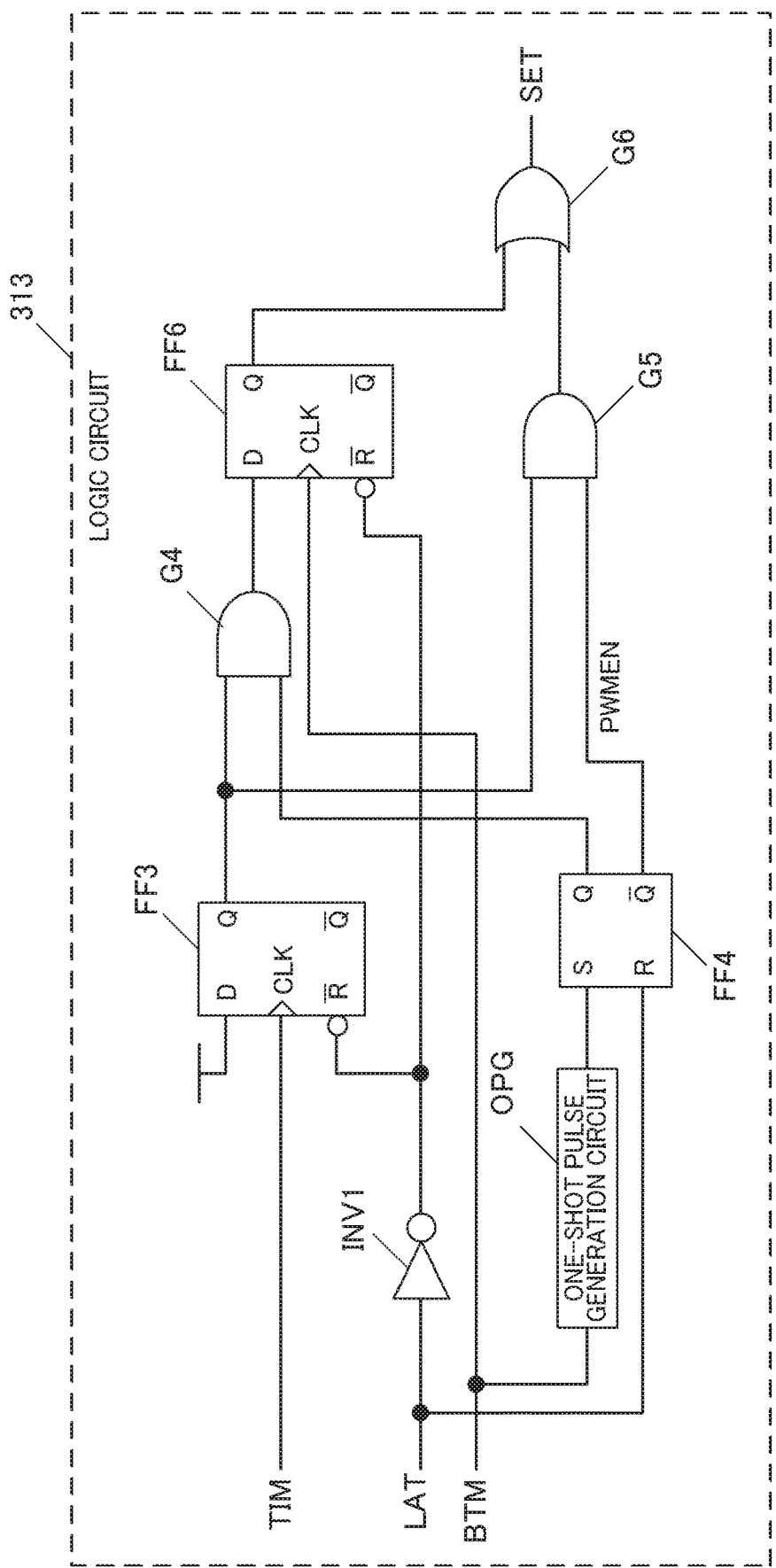
FIG. 9 is a circuit diagram showing a first modification of the logic circuit included in the turn-on trigger generation circuit shown in FIG. 4.
Figure 10:
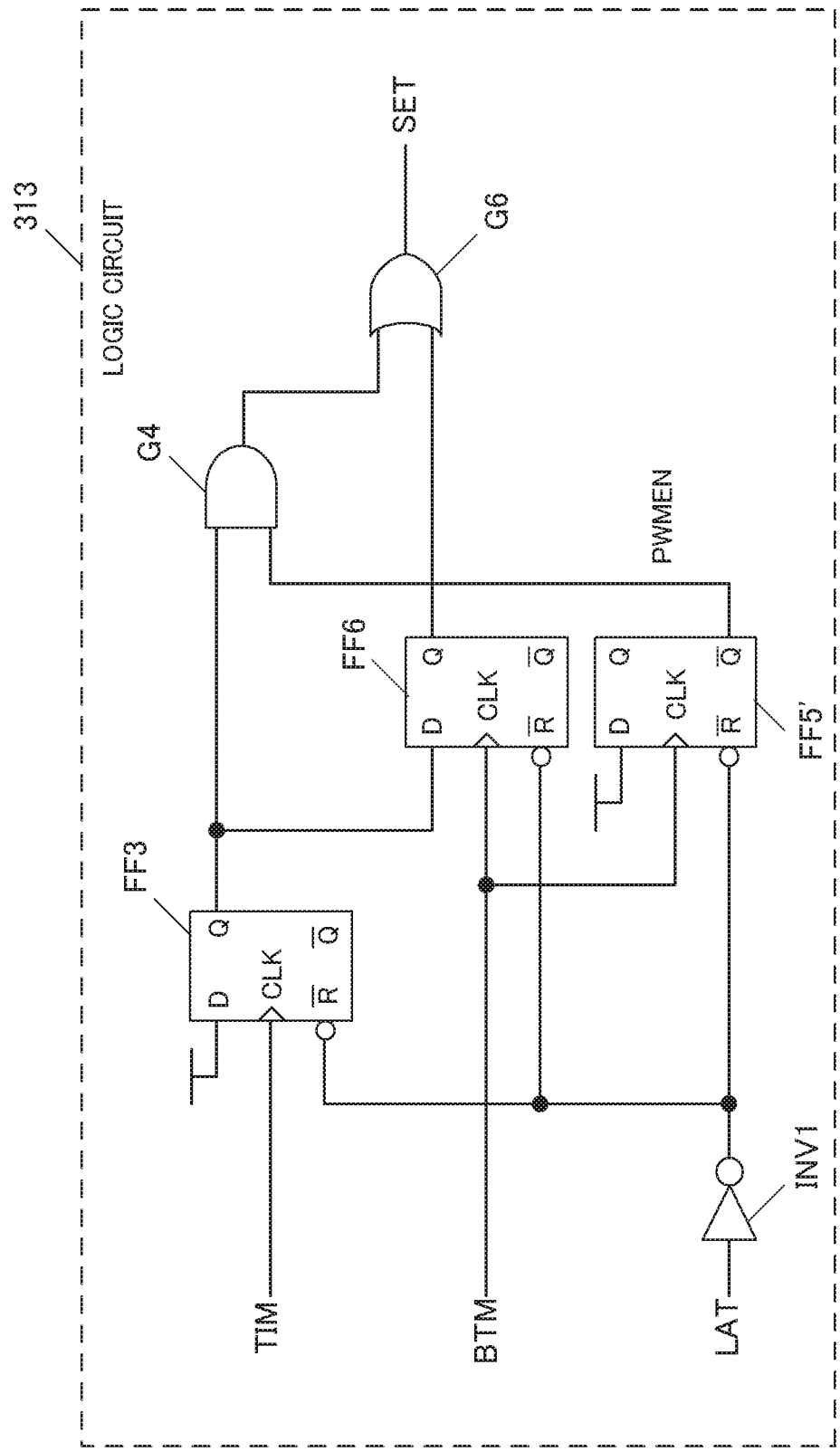
FIG. 10 is a circuit diagram showing a second modification of the logic circuit included in the turn-on trigger generation circuit shown in FIG. 4.
Figure 11:
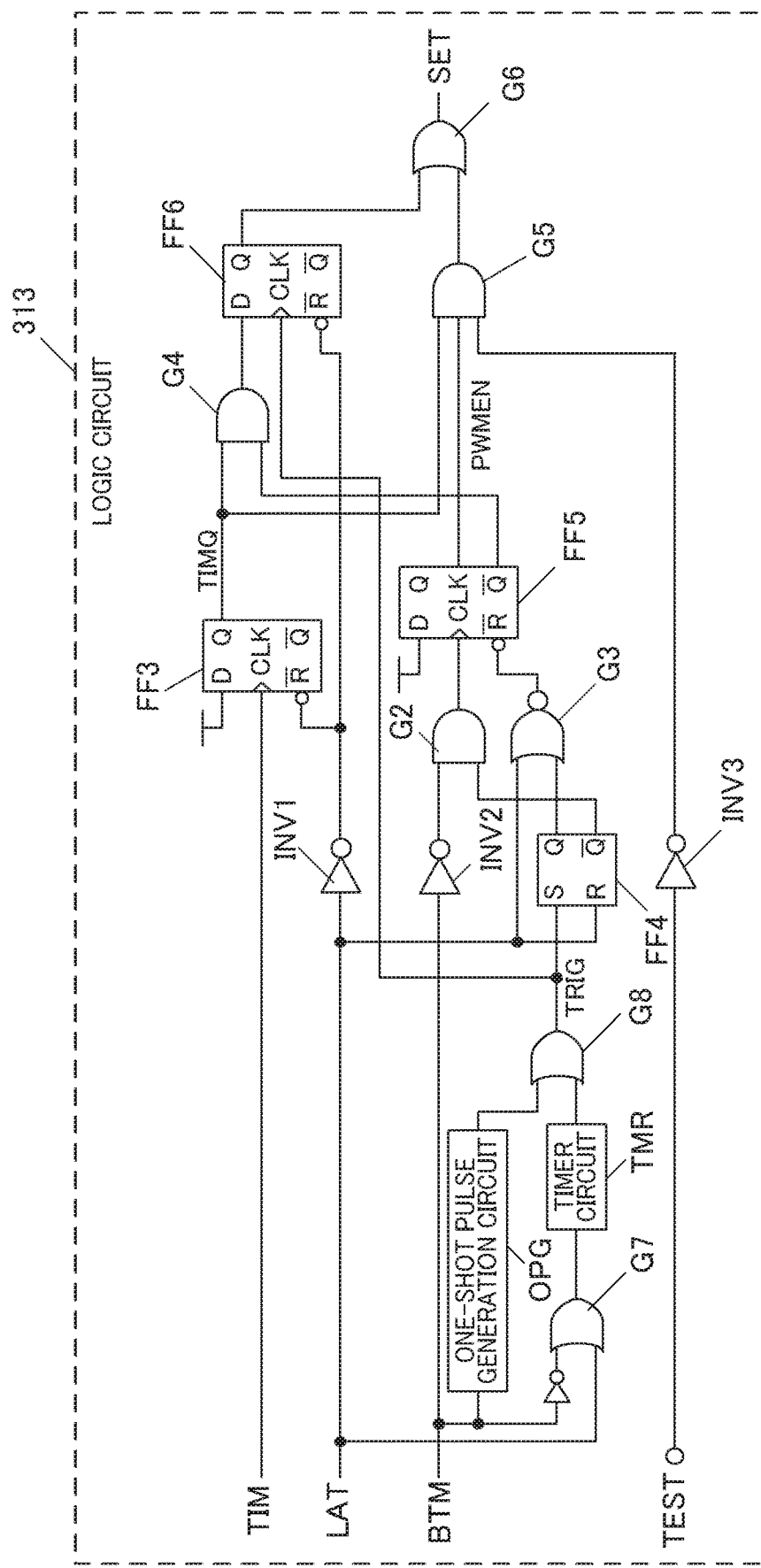
FIG. 11 is a circuit diagram showing a third modification of the logic circuit included in the turn-on trigger generation circuit shown in FIG. 4.

FIG. 9, FIG. 10, and FIG. 11 show a first modification, a second modification, and a third modification of the logic circuit 313 in the turn-on trigger generation circuit 31, respectively.

In the first modification shown in FIG. 9, the inverter INV2, the RS flip-flop FF5, the AND gate G2, and the OR gate G3 in the logic circuit 313 shown in FIG. 6 are omitted.

In the second modification shown in FIG. 10, the inverter INV2, the one-shot pulse generation circuit OPG, the AND gate G2, the OR gate G3, the AND gate G5, and the RS flip-flop FF4 in the logic circuit 313 shown in FIG. 6 are omitted, the D flip-flop FF6 latches the output of the D flip-flop FF3 not via the AND gate G4 but directly, and a D flip-flop FF5' is used instead of the RS flip-flop FF5.

Such simplification of the logic circuit 313 can reduce the size of the circuit 313 with the same basic operation as that of the circuit shown in FIG. 6.

The logic circuit 313 shown in FIG. 11 has an additional function that compulsorily causes the turn-on trigger generation circuit 31 of the above embodiment to output the turn-on trigger signal by time management when the bottom detection circuit 311 becomes unable to detect the bottom. That is, in this third modification, a second timer circuit TMR that measures a predetermined time (e.g. 9 μs) shorter than the time measured by the timer circuit 312 (variable timer 312C) is provided in a stage preceding the RS flip-flop FF4 in the circuit shown in FIG. 6.

Further, in order to generate a signal that clears the second timer circuit TMR, there are also provided: an OR gate G7 that receives an inverted signal of the output LAT of the latch circuit 33 and the output TM of the bottom detection circuit 311 as inputs; and an OR gate G8 that calculates an OR operation of a timeout signal (TRIG) of the second timer circuit TMR and the output of the one-shot pulse generation circuit OPG. The second timer circuit TMR outputs the timeout signal (pulse) TRIG at predetermined time (9 µs) intervals if the clear signal is not input (input signal stays at the high level).

In the third modification, in order to make it possible to evaluate or examine operation in the quasi-resonant mode by inputting a pulse waveform for a test to the external terminal DMG, there are also provided: a terminal TEST to which an instruction(s) to perform a test mode can be input and an inverter INV3 that inverts an input signal of the terminal TEST, and a three-input gate circuit is used as the AND gate G5 provided in a stage following the RS flip-flop FF5 to invalidate a PWM enable signal PWMEN output from the RS flip-flop FF5.

More specifically, when the test mode terminal TEST stays at the high level, one of the inputs of the three-input AND gate G5 changes to the low level, and an output thereof is fixed at the low level. Consequently, even if the PWM enable signal PWMEN changes to the high level, the turn-on trigger signal SET in the PWM mode is not output.

Components except the above are the same as those shown in FIG. 6, and also a basic function (switch between the PWM mode and the quasi-resonant mode) is the same as that described in the above embodiment.

Figure 12:
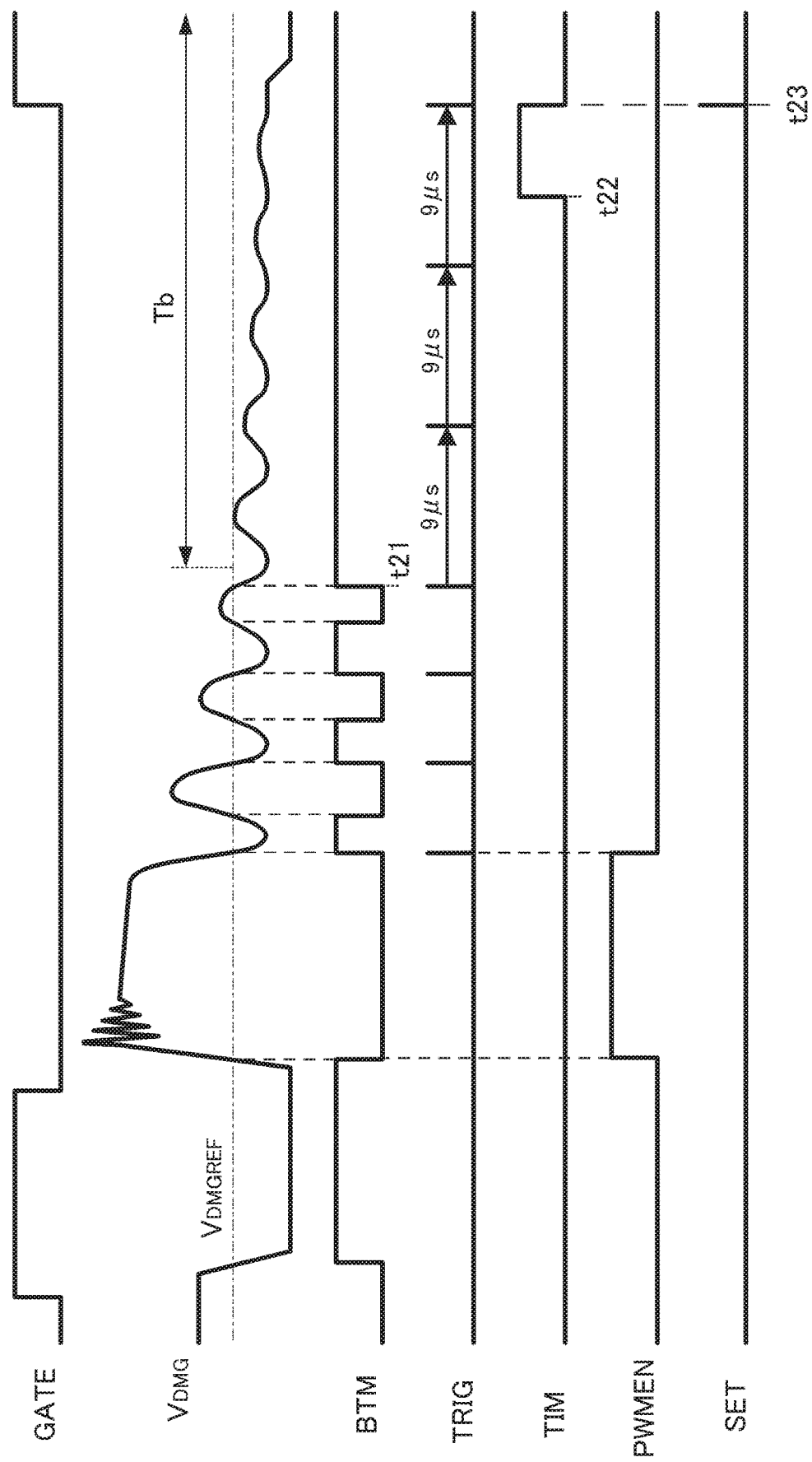
FIG. 12 is a timing chart showing the wavelength of a signal of each component of the semiconductor device to which the logic circuit of the third modification is applied, wherein a zero current resonant voltage is greatly attenuated, and the semiconductor device operates at a timeout.
Figure 13:
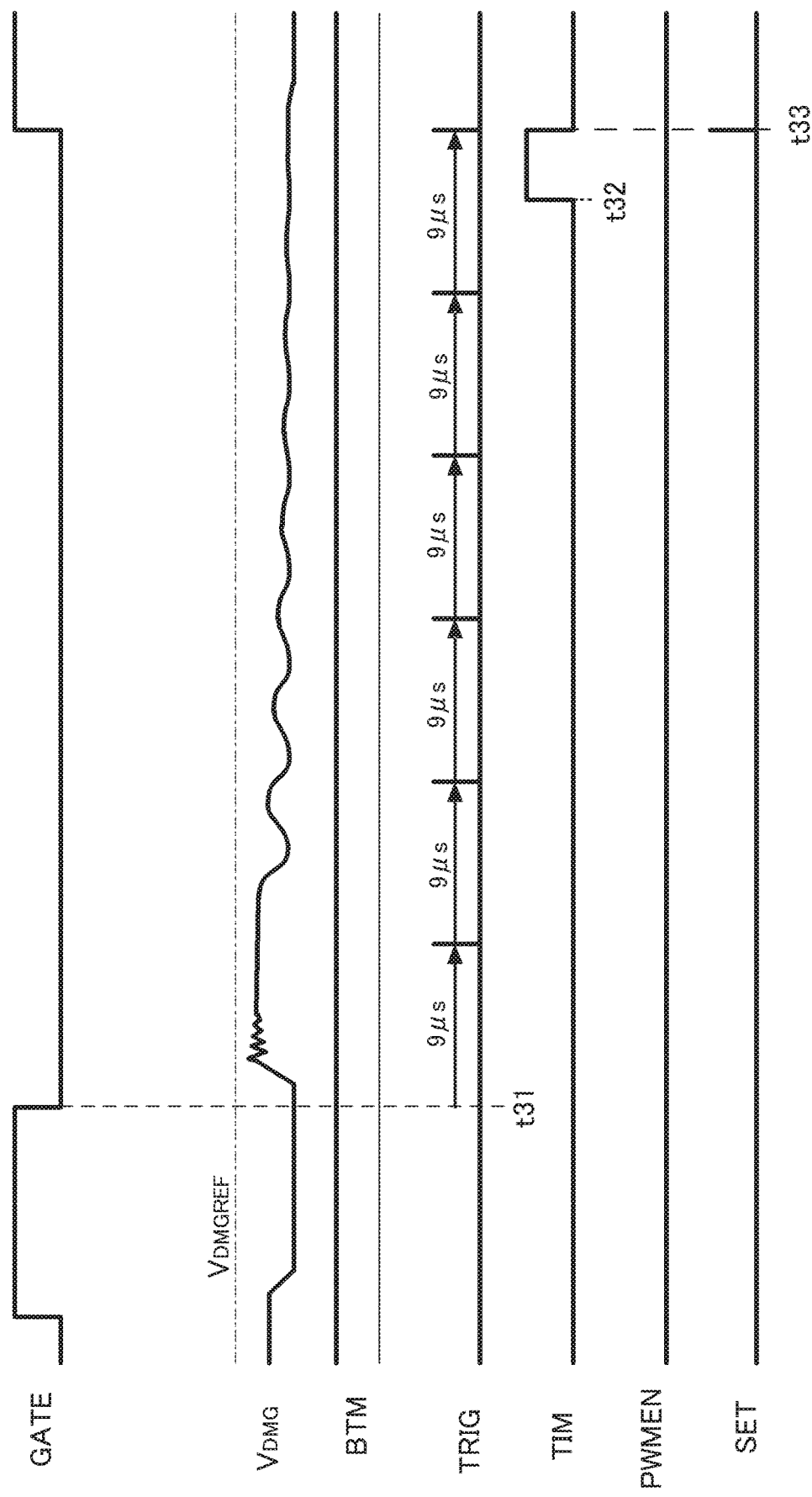
FIG. 13 is a timing chart showing the wavelength of a signal of each component of the semiconductor device to which the logic circuit of the third modification is applied, wherein the amplitude of the zero current resonant voltage is very small, and the semiconductor device operates at a timeout.

Next, operation of the logic circuit 313 shown in FIG. 11 during normal operation (not in the test mode) will be described with reference to timing charts shown in FIG. 12 and FIG. 13. FIG. 12 shows change in waveform of each component of the power supply control IC 13 in a case where the voltage VDMG of the external terminal DMG of the power supply control IC 13 is gradually attenuated after exceeding a predetermined reference voltage (VDMGREF) (resonance). FIG. 13 shows change in waveform of each component of the power supply control IC 13 in a load state in which the voltage VDMG of the external terminal DMG does not exceed the reference voltage (VDMGREF).

As shown in FIG. 12, in the state in which the voltage VDMG of the external terminal DMG of the power supply control IC 13 is gradually attenuated after exceeding the reference voltage (VDMGREF), if the voltage VDMG of the external terminal DMG is attenuated and does not exceed the reference voltage (VDMGREF) like during a period Tb, the bottom detection circuit 311 is unable to detect the bottom, and the output BTM of the bottom detection circuit 311 stays at the high level (timing t21). In this case, the one-shot pulse generation circuit OPG does not output a pulse, and even when the timer circuit 312 is timed out and the output TIM changes to the high level, the flip-flop FF5 cannot perform latching.

In the third modification, while the output BTM of the bottom detection circuit 311 stays at the high level, the second timer circuit TMR outputs a pulse at predetermined time (9 µm) intervals, and when the timer circuit 312 is timed out and the output TIM changes to the high level (timing t22), the flip-flop FF5 performs latching with the output pulse of the second timer circuit TMR, and the turn-on trigger signal SET is generated and output (timing t23).

On the other hand, as shown in FIG. 13, in the load state in which the voltage VDMG of the external terminal DMG does not exceed the reference voltage (VDMGREF), the output BTM of the bottom detection circuit 311 stays at the high level. Hence, from a timing (t31) when the switching transistor SM1 is turned off, the second timer circuit TMR outputs a pulse at predetermined time (9 µm) intervals, and when the timer circuit 312 is timed out and the output TIM changes to the high level (timing t32), the flip-flop FF5 performs latching with the output pulse of the second timer circuit TMR, and the turn-on trigger signal SET is generated and output (timing t33).

Figure 14:
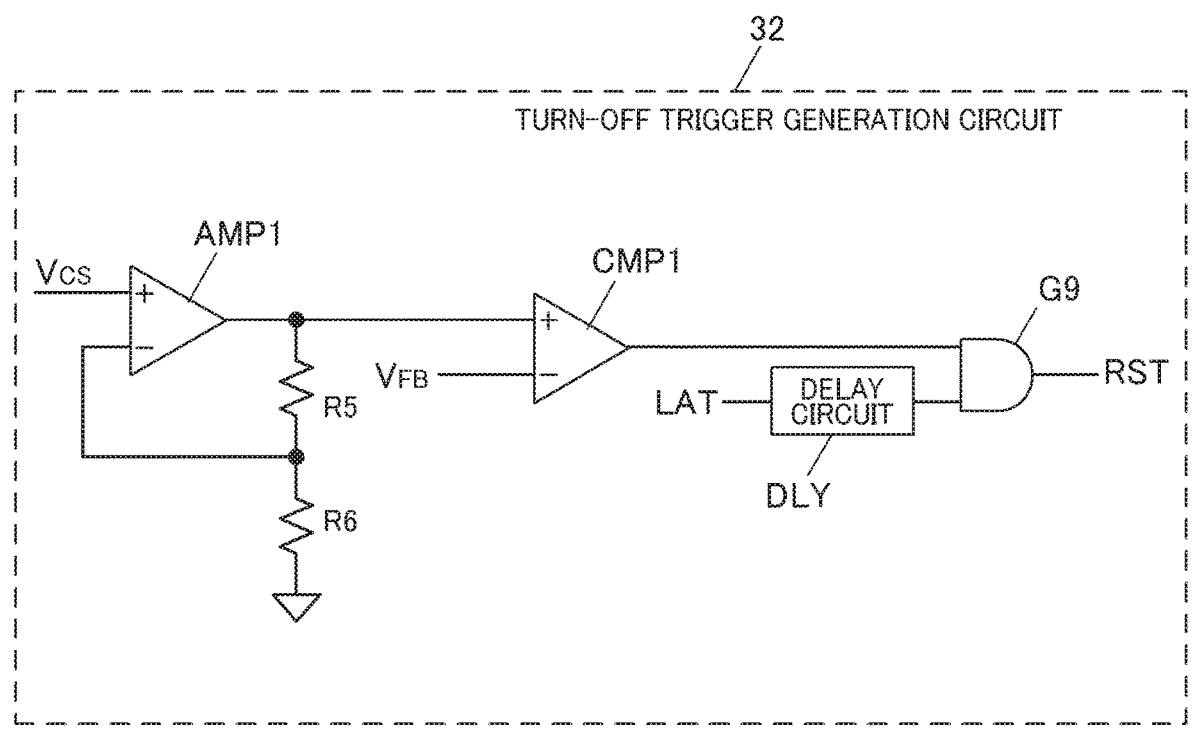
FIG. 14 is a circuit diagram showing a modification of the turn-off trigger generation circuit.
Figure 15A:
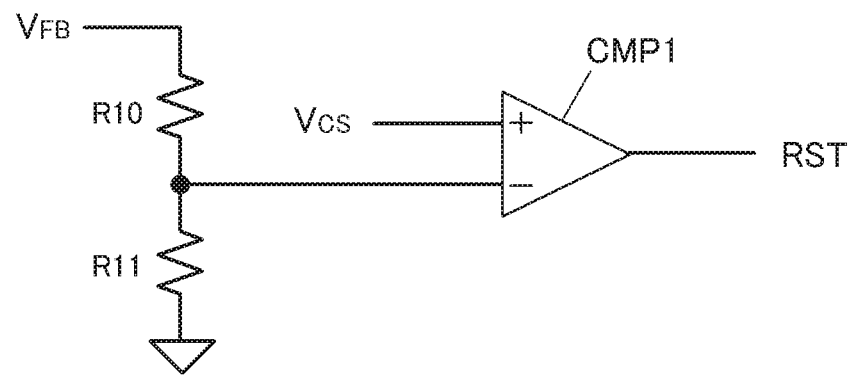
FIG. 15A is a circuit diagram showing another modification of the turn-off trigger generation circuit.
Figure 15B:
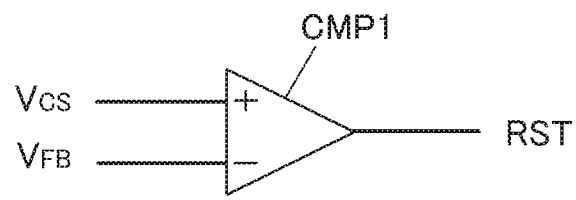
FIG. 15B is a circuit diagram showing still another modification of the turn-off trigger generation circuit.

FIG. 14, FIG. 15A, and FIG. 15B show modifications of the turn-off trigger generation circuit 32.

The turn-off trigger generation circuit 32 shown in FIG. 14 includes: the amplifier circuit that (i) includes the operational amplifier AMP1 and the voltage dividing resistors R5, R6 that divide the output voltage of the operational amplifier AMP1, and (ii) amplifies the voltage Vcs of the external terminal CS; the comparator CMP1 that compares the output voltage of the amplifier circuit with the voltage VFB of the external terminal FB; a delay circuit DLY that delays the output LAT of the latch circuit 33; and an AND gate G9 that calculates an AND operation of a signal obtained by the delay circuit DLY delaying the output LAT and an output signal of the comparator CMP1. The delay circuit DLY may be constituted of, for example, a circuit in which inverters are connected in series.

In the power supply control IC 13 of the above embodiment, while the switching transistor SW1 is OFF, the voltage of its drain terminal increases, and the output of the comparator CMP1 is temporarily at the high level. Hence, in the modification shown in FIG. 14, in order to mask this part, the delay circuit DLY is provided. The delay circuit DLY delays the LAT signal by foreseeing a delay time from when the LAT signal rises, thereby turning on the witching transistor SW1, until when the voltage of the drain terminal decreases. Providing the delay circuit DLY solves the above problem.

The turn-off trigger generation circuit 32 may include, as shown in FIG. 15A, voltage dividing resistors R10, R11 that divide the voltage VFB of the external terminal FB so that a voltage obtained by the voltage dividing resistors R10, R11 dividing the voltage VFB and the voltage Vcs of the external terminal CS are input to the comparator CMP1 to be compared with one another, or may be configured, as shown in FIG. 15B, such that the voltage VFB of the external terminal FB and the voltage Vcs of the external terminal Cs are directly input to the comparator CMP1 to be compared with one another.

Although the present invention conceived by the present inventors has been described in detail with one or more embodiments or the like, the present invention is not limited thereto. For example, although in the above embodiment, the voltage obtained by the resistors R1, R2 as external elements dividing the voltage of the auxiliary winding Nb is input to the external terminal DMG, the voltage of the auxiliary winding Nb may be input to the external terminal DMG directly, or a voltage obtained by resistor elements provided in the power supply control IC 13 or by a resistor element provided in the power supply control IC 13 and an external resistor element dividing the voltage of the auxiliary winding Nb may be input to the external terminal DMG.

Further, although in the above embodiment, the switching transistor SW1 and the current sense resistor Rs are discrete elements, which are separate from the power supply control IC 13, the switching transistor SW1 may be included in the power supply control IC 13, thereby being configured as one semiconductor integrated circuit (where the current sense resistor Rs is an external element). Alternatively, both the switching transistor SW1 and the current sense resistor Rs may be included in the power supply control IC 13. Still alternatively, without the current sense resistor Rs provided, the magnitude of the drain current may be detected from the drain voltage of the provided switching transistor SW1.

As described above, according to an aspect of the present invention, there is provided a semiconductor device for a switching power supply, the semiconductor device generating a drive signal for ON/OFF control of a switching element connected in series to one terminal of a primary-side winding of a transformer for voltage conversion including an auxiliary winding, including:

a first external terminal to which a feedback voltage corresponding to a voltage output from a secondary side of the transformer is input;

a second external terminal to which a voltage induced in the auxiliary winding or a voltage obtained by dividing the induced voltage is input;

an ON timing generation circuit that generates a timing signal that turns on the switching element, based on the voltage of the first external terminal and the voltage of the second external terminal;

an OFF timing generation circuit that generates a timing signal that turns off the switching element, based on the voltage of the first external terminal and a voltage proportional to a current that flows in the switching element; and a drive pulse generation circuit that generates a pulse signal as an origin of the drive signal, based on the signal output from the ON timing generation circuit and the signal output from the OFF timing generation circuit, wherein the ON timing generation circuit includes
a bottom detection circuit that detects a lowest point of the voltage of the second external terminal; and
a first timer circuit that measures a predetermined time, and the ON timing generation circuit,
in response to a change timing of an output of the first timer circuit being before a change timing of an output of the bottom detection circuit, controls the drive pulse generation circuit such that after the measurement by the first timer circuit, the pulse signal rises at an output timing of the first timer circuit, thereby operating in a pulse width modulation mode, and in response to the change timing of the output of the bottom detection circuit being before the change timing of the output of the first timer circuit; controls the drive pulse generation circuit such that the pulse signal rises at an output timing of the bottom detection circuit, thereby operating in a quasi-resonant mode.

The average efficiency of a power supply device is sometimes specified by the average of the power efficiency at four points where an output current is 25%, 50%, 75%, and 100% of a rated output current. However, in the case of operation in the PWM mode only, the power efficiency at 25%, 50%, and 75% in particular varies from device to device. This is because although an ordinary power supply device operates in the discontinuous current mode in regions of a light load to a medium load, soft turn-on is not promised in PWM control, so that efficiency characteristics could wave.

On the other hand, according to the semiconductor device for a switching power supply of the present invention, which has the above configuration, in the regions except the region where the output current is 100% or around of a rated output current, the semiconductor device performs control in the quasi-resonant mode, which generates a smaller switching loss than control in the PWM mode, and softly turns on a switching element (FET: field-effect transistor) at the lowest point (bottom) of the drain voltage always, regardless of the load, and consequently can have a high power efficiency on average.

Under the quasi-resonant control, operation is in the discontinuous current mode. Hence, around a rated load, the switching frequency decreases, and the peak of the winding current of a transformer becomes high. Hence, operation under the quasi-resonant control only requires use of a transformer having a large current capacity, namely a large transformer. On the other hand, according to the semiconductor device for a switching power supply of the present invention, in the region where the output current is 100% or around of the rated output current, the semiconductor device performs control in the PWM mode, under which operation is in the continuous current mode. Hence, even around the rated load, the switching frequency does not decrease, and the peak of the winding current becomes lower than that under the quasi-resonant control. Hence, the semiconductor device of the present invention can use a small transformer.

Further, the higher the frequency is, the smaller the impedance of an output capacitor is, and the more the output ripple is reduced. As described above, the semiconductor device of the present invention performs, around the rated load, control in the PWM mode, in which the frequency is higher than that in the quasi-resonant mode. This can reduce the capacity value of an output capacitor to use, namely can reduce the size of a component(s), which contributes to miniaturization of power supply devices.

Preferably, in the semiconductor device, the predetermined time measured by the first timer circuit is set according to the voltage of the first external terminal so as to be long in response to the voltage of the first external terminal being low and to be short in response to the voltage of the first external terminal being high.

According to the above configuration, if the voltage of the first external terminal (FB) is high, the time measured by the timer circuit is short, and if the time is measured before the zero current resonance is started (or right after the zero current resonance is started, i.e. before the first bottom detection), control in the PWM mode can be performed, whereas if the voltage of the first external terminal is low, the time measured by the timer circuit is long, and if the time is measured after the zero current resonance is started (after the first bottom detection), control in the quasi-resonant mode, in which the switching frequency varies, can be performed.

Further preferably, in the semiconductor device,
the ON timing generation circuit includes:
a second timer circuit; and
a voltage comparator circuit that compares the voltage of the second external terminal with a preset voltage,
in response to (i) the change timing of the output of the bottom detection circuit being before the change timing of the output of the first timer circuit, and (ii-a) the voltage of the second external terminal being attenuated to the preset voltage or lower or (ii-b) the voltage of the second external terminal not exceeding the preset voltage, the second timer circuit starts measurement (iii-a) when the voltage comparator circuit last detects decrease of the voltage of the second external terminal to the preset voltage or lower after the voltage of the second external terminal rises or (iii-b) when the switching element is turned off, and the ON timing generation circuit controls the drive pulse generation circuit such that the pulse signal rises at an output timing due to a timeout of the second timer circuit.

Alternatively, in the semiconductor device, the ON timing generation circuit includes a second timer circuit, the second timer circuit starts measurement after the switching element is turned off, and is reset and restarts the measurement at the change timing of the output of the bottom detection circuit, and the ON timing generation circuit controls the drive pulse generation circuit such that the pulse signal rises when the second timer circuit finishes the measurement as a timeout of the bottom detection circuit.

According to the above configuration, in the quasi-resonant mode, even if the voltage of the second external terminal (DMG) is attenuated to a predetermined voltage (VDMGREF) or lower, or the voltage of the second external terminal does not exceed the predetermined voltage, the turn-on trigger signal rises, and consequently the switching element can be ON/OFF-controlled at appropriate timings.

Still further preferably, in the semiconductor device, the ON timing generation circuit includes a logic circuit that determines which is earlier, the change timing of the output of the bottom detection circuit or the output timing due to a timeout of the first timer circuit, and the ON timing generation circuit includes a terminal to which a signal that invalidates a result of the determination by the logic circuit can be input from outside, the result indicating that the output timing due to the timeout of the first timer circuit is earlier.

According to the above configuration, the determination result by the logic circuit is invalidated by utilizing the terminal (TEST) to which a signal(s) that invalidates a determination result(s) can be input from the outside. This makes it possible to evaluate or examine operation in the quasi-resonant mode by inputting a pulse waveform for a test to the second external terminal (DMS).

The present invention can provide a semiconductor device for a switching power supply and an AC-DC convertor that switch between PWM control and quasi-resonant control during normal operation after a power supply is started, and consequently have a high power efficiency on average and contribute miniaturization of power supply devices by reducing sizes of components, such as a transformer.

Although one or more embodiments of the present invention have been described and shown in detail, the disclosed embodiments are made for purposes of illustration and example only and not limitation. The scope of the present invention should be interpreted by terms of the appended claims.

The entire disclosure of Japanese Patent Application No, 2018-188861 filed on Oct. 4, 2018 is incorporated herein by reference in its entirety.

What is claimed is:

1. A semiconductor device for a switching power supply, the semiconductor device generating a drive signal for ON/OFF control of a switching element connected in series to one terminal of a primary-side winding of a transformer for voltage conversion including an auxiliary winding, comprising:

a first external terminal to which a feedback voltage corresponding to a voltage output from a secondary side of the transformer is input;

a second external terminal to which a voltage induced in the auxiliary winding or a voltage obtained by dividing the induced voltage is input;

an ON timing generation circuit that generates a timing signal that turns on the switching element, based on the voltage of the first external terminal and the voltage of the second external terminal;

an OFF timing generation circuit that generates a timing signal that turns off the switching element, based on the voltage of the first external terminal and a voltage proportional to a current that flows in the switching element; and a drive pulse generation circuit that generates a pulse signal as an origin of the drive signal, based on the signal output from the ON timing generation circuit and the signal output from the OFF timing generation circuit, wherein the ON timing generation circuit includes:

a bottom detection circuit that detects a lowest point of the voltage of the second external terminal; and a first timer circuit that measures a predetermined time, and the ON timing generation circuit, in response to a change timing of an output of the first timer circuit being before a change timing of an output of the bottom detection circuit, controls the drive pulse generation circuit such that after the measurement by the first timer circuit, the pulse signal rises at an output timing of the first timer circuit, thereby operating in a pulse width modulation mode, and in response to the change timing of the output of the bottom detection circuit being before the change timing of the output of the first timer circuit, controls the drive pulse generation circuit such that the pulse signal rises at an output timing of the bottom detection circuit, thereby operating in a quasi-resonant mode.

2. The semiconductor device according to claim 1, wherein the predetermined time measured by the first timer circuit is set according to the voltage of the first external terminal so as to be long in response to the voltage of the first external terminal being low and to be short in response to the voltage of the first external terminal being high.

3. The semiconductor device according to claim 2, wherein the ON timing generation circuit includes:

a second timer circuit; and a voltage comparator circuit that compares the voltage of the second external terminal with a preset voltage, in response to (i) the change timing of the output of the bottom detection circuit being before the change timing of the output of the first timer circuit, and (ii-a) the voltage of the second external terminal being attenuated to the preset voltage or lower or (ii-b) the voltage of the second external terminal not exceeding the preset voltage, the second timer circuit starts measurement (iii-a) when the voltage comparator circuit last detects decrease of the voltage of the second external terminal to the preset voltage or lower after the voltage of the second external terminal rises or (iii-b) when the switching element is turned off, and the ON timing generation circuit controls the drive pulse generation circuit such that the pulse signal rises at an output timing due to a timeout of the second timer circuit.

4. The semiconductor device according to claim 2, wherein the ON timing generation circuit includes a second timer circuit, the second timer circuit starts measurement after the switching element is turned off, and is reset and restarts the measurement at the change timing of the output of the bottom detection circuit, and the ON timing generation circuit controls the drive pulse generation circuit such that the pulse signal rises when the second timer circuit finishes the measurement as a timeout of the bottom detection circuit.

5. The semiconductor device according to claim 1, wherein the ON timing generation circuit includes a logic circuit that determines which is earlier, the change timing of the output of the bottom detection circuit or the output timing due to a timeout of the first timer circuit, and the ON timing generation circuit includes a terminal to which a signal that invalidates a result: of the determination by the logic circuit can be input from outside, the result indicating that the output timing due to the timeout of the first timer circuit is earlier.

6. An AC-DC convertor comprising:

the semiconductor device according to claim 1;

the transformer that includes the auxiliary winding and in which a voltage obtained by rectifying an alternating current voltage is applied to the primary-side winding; and the switching element connected to the primary-side winding, wherein the AC-DC convertor controls the switching element by using the semiconductor device.

* * * * *

UNITED STATES PATENT AND TRADEMARK OFFICE
CERTIFICATE OF CORRECTION

PATENT NO. : 10,720,847 B2
APPLICATION NO. : 16/591573
DATED : July 21, 2020
INVENTOR(S) : Hiroki Matsuda et al.

It is certified that error appears in the above-identified patent and that said Letters Patent is hereby corrected as shown below:

In the Claims

Column 17, Line 12, delete "result:" and insert --result--.

Signed and Sealed this
Twentieth Day of October, 2020

Andrei Iancu
*Director of the United States Patent and Trademark Office*